United States Patent
Liu et al.

(10) Patent No.: US 10,187,810 B1
(45) Date of Patent: Jan. 22, 2019

(54) DYNAMICALLY PRIORITIZING NETWORK TRAFFIC

(71) Applicant: Sprint Spectrum LP, Overland Park, KS (US)

(72) Inventors: Chunmei Liu, Great Falls, VA (US); Krishna Sitaram, Chantilly, VA (US); Hemanth Pawar, Brambleton, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 290 days.

(21) Appl. No.: 14/942,431

(22) Filed: Nov. 16, 2015

(51) Int. Cl.
| | |
|---|---|
| H04W 24/02 | (2009.01) |
| H04W 24/08 | (2009.01) |
| H04B 7/14 | (2006.01) |
| H04W 72/12 | (2009.01) |

(52) U.S. Cl.
CPC ............. *H04W 24/02* (2013.01); *H04B 7/14* (2013.01); *H04W 24/08* (2013.01); *H04W 72/12* (2013.01)

(58) Field of Classification Search
CPC ..... H04W 24/02; H04W 24/08; H04W 72/12; H04B 7/14
See application file for complete search history.

(56) References Cited

U.S. PATENT DOCUMENTS

| | | | |
|---|---|---|---|
| 8,737,314 B2 | 5/2014 | Stamoulis et al. | |
| 8,767,541 B2 | 7/2014 | Stamoulis et al. | |
| 8,948,006 B2 | 2/2015 | Taneja | |
| 2008/0228977 A1* | 9/2008 | Dignum | G06F 13/1642 710/240 |
| 2011/0261747 A1* | 10/2011 | Wang | H04B 7/155 370/315 |
| 2012/0039242 A1* | 2/2012 | Alexiou | H04B 7/155 370/315 |
| 2012/0140633 A1* | 6/2012 | Stanwood | H04L 47/2458 370/235 |
| 2013/0040558 A1* | 2/2013 | Kazmi | H04W 16/26 455/9 |
| 2013/0090121 A1* | 4/2013 | Zhang | H04W 72/04 455/450 |
| 2013/0163508 A1* | 6/2013 | Yu | H04W 16/14 370/315 |
| 2013/0336200 A1* | 12/2013 | Andreozzi | H04W 40/22 370/315 |

* cited by examiner

*Primary Examiner* — Siming Liu

(57) ABSTRACT

A UE is configured to function as a relay on behalf of a donor access node. The donor access node can dynamically adjust scheduling of resources to the relay UE based on a size of a buffer associated with the relay UE. The donor access node monitors a size of the buffer and, if the size exceeds a threshold, assigns a greater scheduling weight to the relay UE. Similarly, when the buffer size associated with the relay UE drops below a threshold, the scheduling weight may be lowered. The buffer may include any combination of a downlink buffer stored on the donor access node or an uplink buffer stored on the relay UE.

18 Claims, 7 Drawing Sheets

1

DYNAMICALLY PRIORITIZING NETWORK TRAFFIC

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a UE as a relay node or relay UE for relaying communication between a base station or access node, and an end-user UE. Relay UEs may be used at the edge of a coverage area of an access node to improve coverage and/or service, as well as in crowded areas having a high number of other UEs to increase the available throughput to the UEs being relayed. Relay UEs may also be implemented in networks to reduce backhaul costs by providing wireless backhaul to the core network. However, relay UEs may not receive enough resources, or be given enough priority by the access node, to effectively improve the service and/or network conditions of the other UEs being relayed.

OVERVIEW

Exemplary embodiments described herein include systems, methods, and nodes for dynamically prioritizing network traffic. For instance, a method for prioritizing devices in a wireless network includes monitoring a buffer size associated with a relay user equipment (UE). The buffer size reflects, in part, a usage of a first end-user UE that access services via the relay UE. A scheduling weight for scheduling network resources from a donor access node to the relay UE is increased when the buffer size increases beyond a first threshold. In addition, the scheduling weight is reduced when the buffer size decreases beyond a second threshold.

A system for prioritizing devices in a wireless network includes a donor access node configured to provide wireless services to a first user equipment (UE) via a relay UE and to a second UE directly, and a processor communicatively coupled to the donor access node. The processor configures the donor access node to execute operations comprising monitoring a buffer size associated with the relay UE, which reflects, in part, a usage of the first UE that access services via the relay UE. A scheduling weight for scheduling network resources to the relay UE is dynamically adjusted based on changes to the buffer size associated with the relay UE. The changes to the buffer size associated with the relay UE exceed one or more thresholds in order to trigger the dynamic adjusting.

A processing node for prioritizing devices in a wireless network is configured to perform operations including receiving an indication that a first user equipment (UE) on the wireless network is functioning as a relay UE. In response to the indication, the processing node monitors a buffer size associated with the relay UE, which reflects, in part, a usage of a first end-user UE that access services via the relay UE. If the buffer size increases beyond a first threshold, the processing node increases a scheduling weight for scheduling network resources from a donor access node to the relay UE. If the buffer size decreases beyond a second threshold, the processing node reduces the scheduling weight for scheduling network resource from the donor access node to the relay UE.

DETAILED DESCRIPTION

In embodiments disclosed herein, when a UE is configured to function as a relay UE on behalf of a donor access node, the donor access node can dynamically adjust scheduling of resources to the relay UE based on a size of a buffer associated with the relay UE. For example, when the relay UE accesses the wireless network, the relay UE signals to a donor access node that it is a relay that is intended to provide services to multiple end-user UEs. The donor access node may then dynamically adjust scheduling weights for all the UEs that are requesting services, including the relay UE. The donor access node may monitor a buffer size associated with each UE, and assign a scheduling weight corresponding to the buffer size. A default scheduling weight may be assigned to standard end-user UEs that access services directly from the donor access node. The relay UE may also be assigned the default scheduling weight, until other end-user UEs begin accessing services from, or attach to, the relay UE. This increases a traffic load on the relay UE, correspondingly increasing a size of a buffer associated with the relay UE. The donor access node monitors a size of the buffer and, if the size exceeds a threshold, assigns a greater scheduling weight to the relay UE. Similarly, when the buffer size associated with the relay UE drops below a threshold, the scheduling weight may be lowered. The buffer may include any combination of a downlink buffer stored on the donor access node or an uplink buffer stored on the relay UE.

In addition, the donor access node may prioritize the relay UE for subsequent available scheduling slots. For instance, when it is determined that a quality-of-service from one or more UEs attached to the donor access node fails to meet a QoS criteria, the UE relay is provided with a higher priority for accessing the subsequent scheduling slot versus any other UE attached to the donor access node. In other words, when the donor access node does not have enough resources to schedule both the relay UE and the standard end-user UE, the QoS of the relay UE will be maintained while the QoS of any other UE may be terminated, even if the other UE also fails to meet the QoS criteria.

Figure 1:
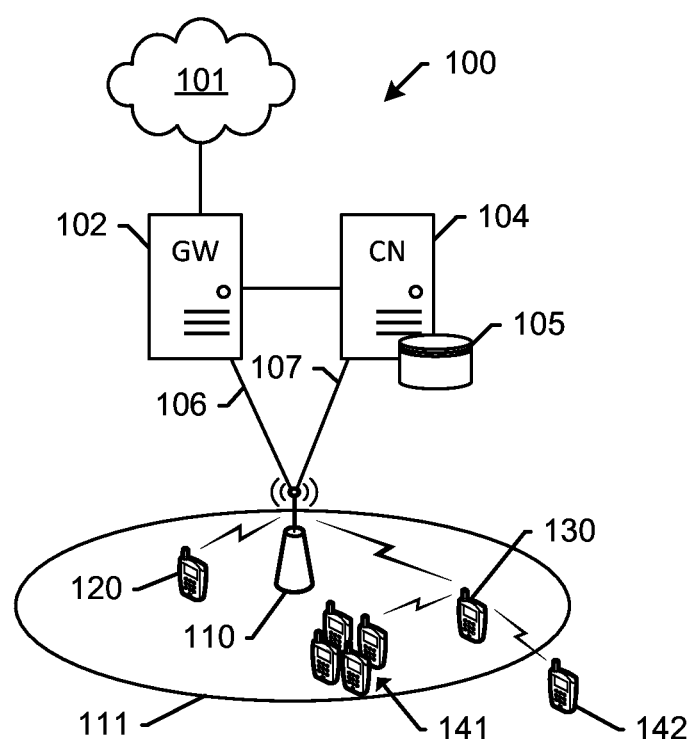
FIG. 1 depicts an exemplary system for dynamically prioritizing network traffic.

FIG. 1 depicts an exemplary system 100 for dynamically prioritizing network traffic. System 100 comprises a communication network 101, gateway 102, controller node 104, access node 110, and UEs 120, 130, 141, and 142. Access node 110 is illustrated as having coverage area 111. UEs 120, 130, and 141 are located within coverage area 111, with UEs 141 comprising a cluster of UEs concentrated within a small geographic area. UE 142 is located outside coverage area 111. Access node 110 is illustrated as having established direct (i.e. unrelayed) communication with UEs 120 and 130. Moreover, UE 130 provides services from access node 110 to UE 141, 142 by acting as a relay UE. When a UE in communication with access node 110 is acting as a relay, access node 110 may be referred to as a donor access node.

In this embodiment, UE 130 may be configured to function as a relay on behalf of donor access node 110. When (or in response to) UE 130 functions as a relay (e.g., for communication with UE 132 and/or UE 133), UE 130 sends a message to donor access node 110 to indicate to donor access node 110 (and/or communication system 100) that UE 130 is functioning as a relay. In this manner, because donor access node 110 (and/or communication system 100) now knows that UE 130 is functioning as a relay on behalf of donor access node 110, donor access node 110 can alter how UE 130 is treated. For example, UE 130 may be provided with preferential treatment because it is functioning as a relay. Examples of preferential treatment can include, but are not limited to, increasing a scheduling weight for relay UE 130 depending on a buffer size associated with relay UE 130, setting one or more network parameters in order to give traffic associated with UE 130 better network performance than traffic associated with non-relaying UE 120, and so on.

Network parameters may be configured to provide one or more of higher priority in scheduling resources, improved RF conditions, higher throughput, lower latency, etc. to UE 130 than is provided to non-relaying UE 120. For instance, when it is determined that a quality-of-service from one or more of UEs 120, 130 attached to donor access node 110 fails to meet a QoS criteria, UE relay 130 is provided with a higher priority for accessing the subsequent scheduling slot versus any non-relay UE attached to donor access node 110 such as UE 120. In other words, when donor access node 110 does not have enough resources to schedule both relay UE 130 and the standard end-user UE 120, the QoS of relay UE 130 will be maintained while the QoS of UE 120 will be terminated.

In an embodiment, relay UE 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted by relay UE 130 to one or more of UEs 141, 142. Likewise, RF signals received from UEs 141, 142 are amplified and transmitted by relay UE 130 to donor access node 110. Alternatively or in addition, a layer 2 relay device performs a decode and forward (DF) function. RF signals received from donor access node 110 are demodulated and decoded, then encoded and modulated again before being transmitted by relay UE 130 to one or more of UEs 141, 142. Likewise, RF signals received from one or more of UEs 141, 142 are demodulated and decoded, then encoded and modulated again before being transmitted by relay UE 130 to donor access node 110. Alternatively or in addition, a layer 3 relay device also performs a decode and forward function. However, a layer 3 relay device also performs additional processing (such as ciphering and/or data concatenation/segmentation/reassembly) In other words, relay UE 130 performs demodulation and decoding of the received RF signals (either uplink or downlink), processes received data, then encodes, modulates, and transmits the data to one or more of UEs 141, 142.

UEs 120, 130, 141, 142 may be any device, system, combination of devices, or other such communication platform capable of communicating wirelessly with donor access node 110 using one or more frequency bands deployed by donor access node 110. UEs 120, 130, 141, 142 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via donor access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by UEs 120, 130, 141, 142. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, 108, 109 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing UE information, including which UEs are operating as relay UEs, such as relay UE 130. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access node 110 can be any network node configured to provide communication between UEs 120, 130, 141, 142 and communication network 101. Access node 110 can be a standard access node and/or a short range, low power, small access node. A standard access node can be a macrocell access node such as a base transceiver station, a radio base station, an eNodeB device, or an enhanced eNodeB device, or the like. In an exemplary embodiment, a macrocell access node can have a coverage area 111 in the range of approximately five kilometers to thirty five kilometers and an output power in the tens of watts. A small access node can include a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access nodes 110 can comprise a processor and associated circuitry to execute or direct the execution of computer-readable instructions to obtain information. Access nodes 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 can receive instructions and other input at a user interface. Access node 110 communicates with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements may be present to facilitate communication, such as between access nodes 110 and communication network 101 that are omitted for clarity, including additional processing nodes, routers, gateways, and physical and/or wireless data links for carrying data among the various network elements.

Figure 2:
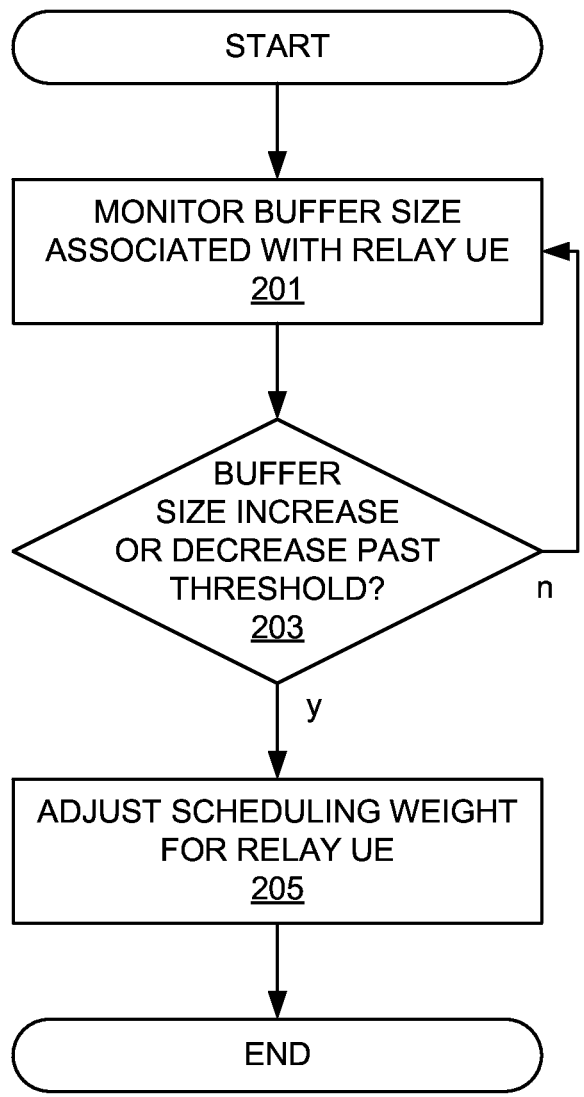
FIG. 2 depicts an exemplary method for dynamically prioritizing network traffic.

FIG. 2 depicts an exemplary method for dynamically prioritizing network traffic. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 201, a buffer size associated with the relay UE is monitored. The monitoring may be performed by an access node such as donor access node 110, or any other node on the network, such as controller node 104. The monitoring may be triggered by a message sent from the relay UE indicating that the relay UE is functioning as a relay. For example, when the relay UE accesses the wireless network, the relay UE signals to a donor access node that it is a relay that is intended to provide services to multiple end-user UEs. The message may also include a scheduling request that communicates to a donor access node that the relay UE is asking for an allocation of air-interface resources. In response, the donor access node schedules resources for the relay UE, and monitors the buffer size associated with the relay UE, so as to dynamically adjust scheduling of resources to the relay UE based on a size of the buffer. The donor access node may dynamically adjust scheduling weights for all the UEs that are requesting services, including the relay UE.

In 203, if the buffer size increases or decreases past a threshold, the scheduling weight for the relay UE may be adjusted in 205. For example, a default scheduling weight may be assigned to all UEs that access services directly from the donor access node, including the relay UE. When other end-user UEs begin accessing services from, or attach to, the relay UE, a buffer size of the relay UE increases. The buffer size may be a portion of a downlink buffer that is stored on the donor access node and allocated to the relay UE. The buffer size may be increased based on a level of traffic requested by the end-user UE's connected to the relay UE. For instance, an application request on an end-user UE that is relayed to the donor access node via the relay UE may trigger an increase in the downlink buffer size associated with the relay UE. In other embodiments, when a large number of end-user UEs, such as UEs 142 attach to relay UE 130, the size of the downlink buffer associated with the relay UE may be increased. In other embodiments, an uplink buffer of the relay UE may fluctuate in size depending on the number of end-user UEs attached to the relay UE, and/or their traffic demands. The uplink and downlink cases are further described with reference to FIGS. 3-6.

In either case, the buffer size may fluctuate until it reaches a high or low threshold. If the threshold is reached, in 205, the scheduling weight may be adjusted. The scheduling weight is related to a proportion of scheduling resources, such as physical resource blocks (PRBs), power, bandwidth, etc. that are provided to the relay UE. If an upper threshold is crossed, an increase in scheduling weight may be triggered, so that the relay UE provides better services to the end-users attaching to it. If a lower threshold is crossed, the scheduling weight may be decreased, so as to balance out the resource allocation among other UEs attached to the donor access node. The donor access node monitors a size of the buffer and, if the size exceeds a threshold, assigns a greater scheduling weight to the relay UE. Similarly, when the buffer size associated with the relay UE drops below a threshold, the scheduling weight may be lowered.

For example, the donor access node may maintain n weights $w_1, w_2, \ldots, w_n$, and n levels of buffer size $b_1, b_2, \ldots b_n$, where $w_1 < w_2 < \ldots < w_n$, and $b_1 < b_2 < \ldots < b_n$. n may be any number that is 2 or more. By default, the donor access node scheduler assigns weight $w_1$ to standard end-user UEs that attach to it directly. When a buffer size for the relay UE is below b1, the donor access node may assign the same weight $w_1$ to the relay UE. In other words, the relay UE has the same priority in gaining scheduling resources from the donor access node. As traffic demands on the relay UE increase, the buffer size would correspondingly increase. When the buffer size for the relay UE reaches or exceeds $b_2$, the donor access node can assign the next weight $w_2$ to the relay UE, while maintaining weight $w_1$ to the other UEs. In this way, the relay UE gets higher priority in getting scheduling resource from donor access node to empty its buffer. In some embodiments, the donor access node assigns the weight $w_i$ to any UE relay having a buffer size between $b_{(i-1)}$ and $b_i$. Other threshold triggers may be conceivable to those having ordinary skill in the art upon reading this disclosure.

Figure 3:
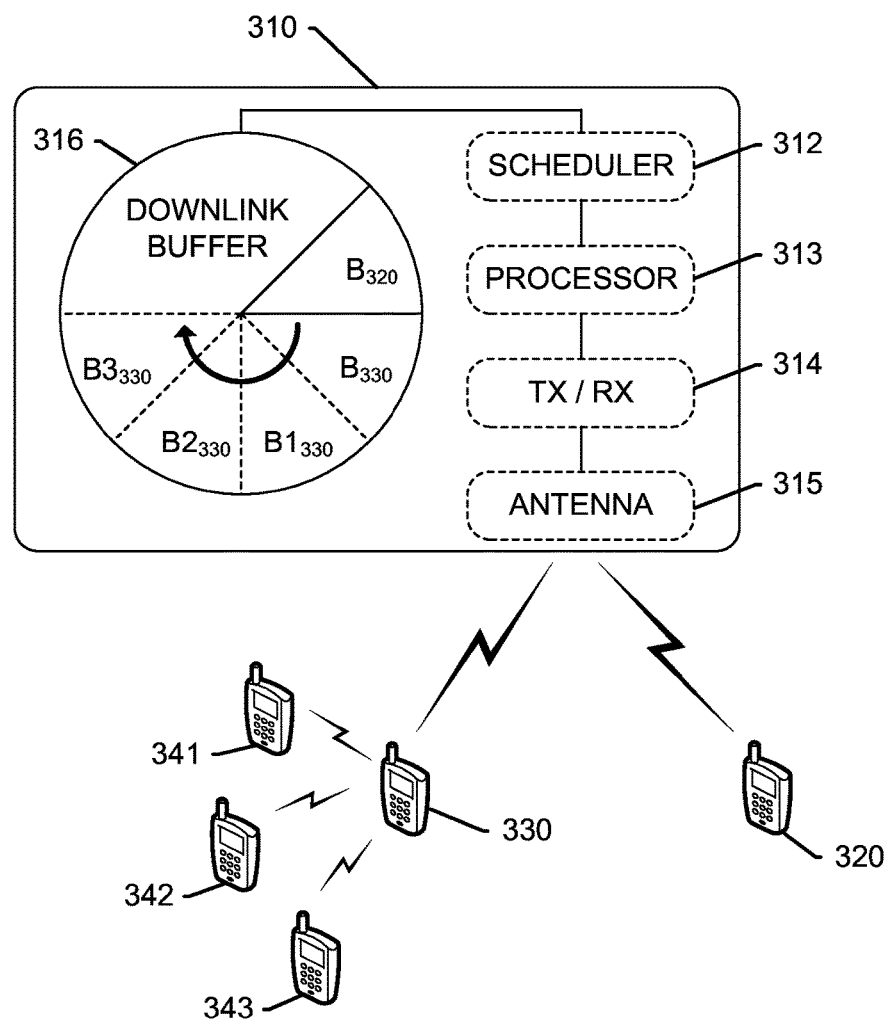
FIG. 3 depicts an exemplary donor access node for dynamically prioritizing network traffic using a downlink buffer.

As described herein, the buffer may include any combination of a downlink buffer stored on the donor access node or an uplink buffer stored on the relay UE. FIG. 3 depicts an exemplary donor access node for dynamically prioritizing network traffic using a downlink buffer. A donor access node 310 is illustrated as comprising a scheduler module 312, a processor 313, a transceiver 314, an antenna 315, and a downlink buffer 316. At least UEs 320 and 330 are in direct (i.e. unrelayed) communication with donor access node 310. Moreover, UE 330 provides services from donor access node 310 to UE 341, 342, 343 by acting as a relay UE. UE 330 may begin to function as a relay UE by sending a message to donor access node 310 to indicate to donor access node 310 that UE 330 is functioning as a relay UE. Thus, donor access node 310 can alter how UE 330 is treated. For example, UE 330 may be provided with preferential treatment because it is functioning as a relay.

For example, a downlink sub-buffer $B_{330}$ corresponding to UE relay 330, that is stored within a downlink buffer 316 on donor access node 310, may be dynamically adjustable. As UEs 341, 342, and 343 attach to relay UE 330 and/or request services therefrom, downlink sub-buffer $B_{330}$ may increase in size to $B1_{330}, B2_{330},$ and $B3_{330}$. Further, at each threshold B1, B2, etc., scheduler 312 may assign increased scheduling weight to relay UE 330. For example, scheduler module 312 may include logical instructions to enable processor 313 to monitor downlink buffer 316, and assign additional resource blocks to relay UE 330 via transceiver 314 and antenna 315.

Further, sub-buffer $B_{320}$ associated with UE 320 that is directly attached to donor access node 310 may remain at a default size. Consequently, the weight assignment of UE 320 does not change, or may grow relatively smaller as sub-buffer $B_{330}$ increases. In an embodiment, the weight assignments of each UE 320, 330 may be relatively adjusted based on their respective buffer sizes. Further, sub-buffer $B_{320}$ may also be monitored so as to dynamically assign scheduling weights to UE 320 based on its buffer usage.

Moreover, network parameters for relay UE 330 may be configured to provide one or more of higher priority in scheduling resources, improved RF conditions, higher throughput, lower latency, etc. to UE 330 than is provided to non-relaying UE 320. For instance, when it is determined that a quality-of-service from one or more of UEs 320, 330 attached to donor access node 310 fails to meet a criteria, UE relay 330 is provided with a higher priority for accessing the subsequent scheduling slot versus any non-relay UE attached to donor access node 310 such as UE 320. In other words, when donor access node 310 does not have enough resources to schedule both relay UE 330 and the standard end-user UE 320, the QoS of relay UE 330 will be maintained while the QoS of UE 320 will be terminated.

Figure 4:
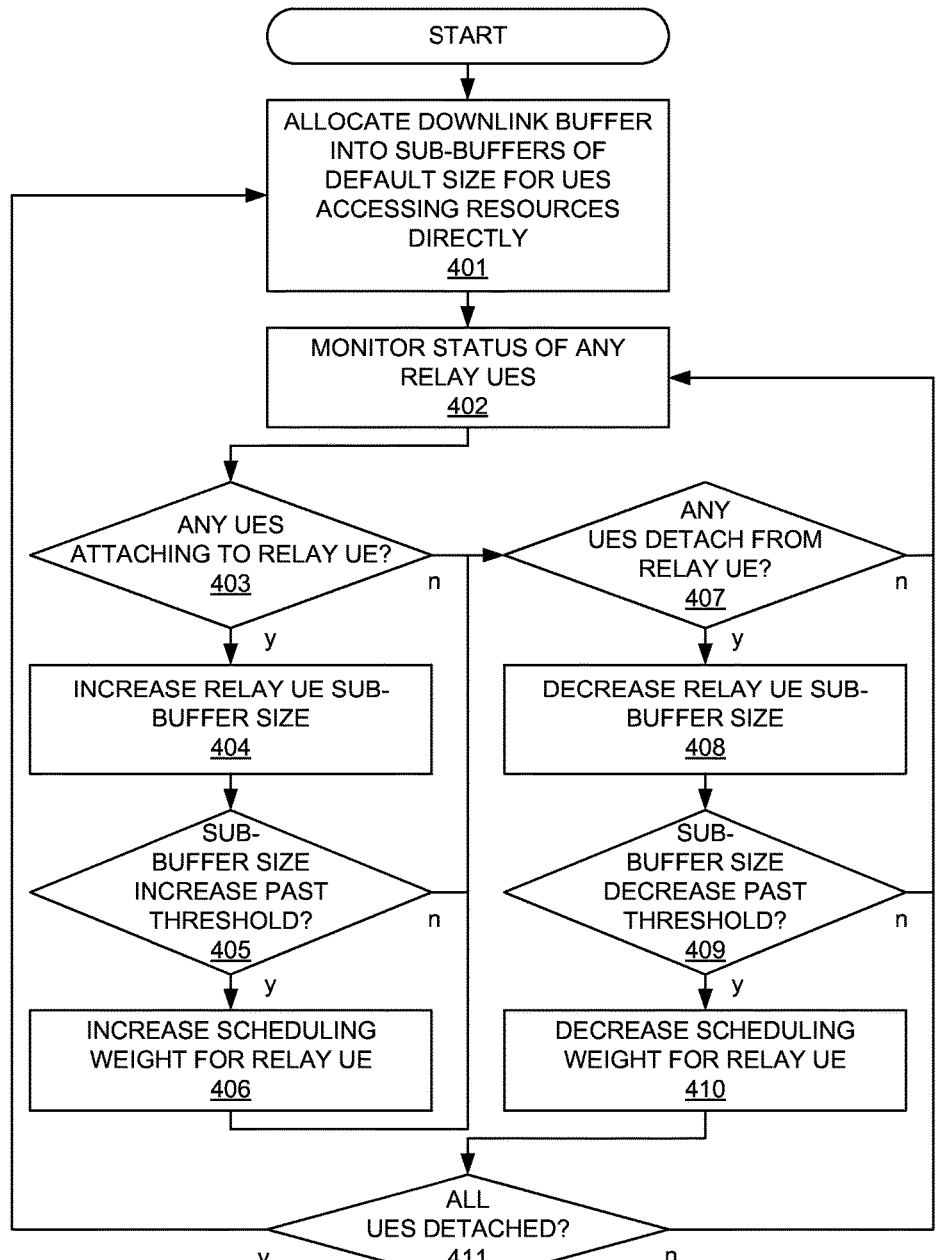
FIG. 4 depicts an exemplary method for dynamically prioritizing network traffic using a downlink buffer.

FIG. 4 depicts an exemplary method for dynamically prioritizing network traffic using a downlink buffer. The method will be discussed with reference to donor access node 310. However, the method can be implemented with any suitable network node. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 401, a downlink buffer on donor access node 310 is allocated into sub-buffers of default size per UE accessing resources directly from donor access node 310. The default size may be a space allocation, and may be preset so as to conform to a corresponding default weight for scheduling resources to each UE. For example, the donor access node may maintain n weights $w_1, w_2, \ldots, w_n$, and n levels of buffer size $b_1, b_2, \ldots b_n$, where $w_1 < w_2 < \ldots < w_n$, and $b_1 < b_2 < \ldots < b_n$. n may be any number that is 2 or more. By default, the donor access node scheduler assigns weight $w_1$ to standard end-user UEs that attach to it directly. When a buffer size for the relay UE is below b1, the donor access node may assign the same weight $w_1$ to the relay UE. In other words, the relay UE has the same priority in gaining scheduling resources from the donor access node.

Step 401 is optional, and alternative methods may simply assign a default weight to each UE, and subsequently modify the weight based on changes in the size of the sub-buffer. In 402, any relay UEs attaching to the donor access node are monitored. The monitoring may be triggered by a message sent from the relay UE indicating that the relay UE is functioning as a relay. For example, when the relay UE accesses the wireless network, the relay UE signals to a donor access node that it is a relay that is intended to provide services to multiple end-user UEs. The message may also include a scheduling request that communicates to a donor access node that the relay UE is asking for an allocation of air-interface resources. In response, the donor access node schedules resources for the relay UE, and monitors the buffer size associated with the relay UE, so as to dynamically adjust scheduling of resources to the relay UE based on a size of the buffer. As described herein, a sub-buffer size of the relay UE may be directly proportional to a number and/or traffic usage of the end-user UEs attached thereto.

In 403, if it is detected that additional UEs are attaching to the relay UE, the relay UE buffer size is correspondingly increased. This determination is not necessarily based only on the attachment, i.e. it may also be based on the usage requirement of the UE being attached. If no UEs are being attached, or if UEs attached to the relay UE have low traffic usage, the method moves into the buffer reduction steps 407-410. However, if it is determined that UEs are being attached and/or increasing a usage or throughput of the relay UE, then in 404, the sub-buffer size of the relay UE is increased. This step may also be a direct consequence of the attaching, i.e. the sub-buffer is not actively increased, but may be a direct consequence of the attachment of the UE in 403. The buffer size increase may be based on a level of traffic requested by the end-user UE's connected to the relay UE. For instance, an application request on an end-user UE that is relayed to the donor access node via the relay UE may trigger an increase in the downlink buffer size associated with the relay UE. In other embodiments, when a large number of end-user UEs, such as UEs 342 attach to a relay UE, such as relay UE 330, the size of the downlink buffer associated with the relay UE may be increased. In either case, the buffer size may fluctuate until it reaches a high or low threshold.

In 405 it is determined if the sub-buffer size is increased past a threshold. For example, the thresholds described with respect to FIGS. 2 and 3 may be used to make this determination. If it is determined that the threshold is not met, then the method moves to the buffer-reduction steps 407-410. However, if the threshold is met, then in 406, the scheduling weight for the relay UE is increased. The increase may be proportional to the threshold increase of the sub-buffer size as described herein. For example, the scheduling weight may be increased by an incremental amount every time the sub-buffer size increases by a threshold amount. A plurality of thresholds may be defined along with a corresponding plurality of scheduling weights. For example, as traffic demands on the relay UE increase, the buffer size would correspondingly increase. When the buffer size for the relay UE reaches or exceeds $b_2$, the donor access node can assign the next weight $w_2$ to the relay UE, while maintaining weight $w_1$ to the other UEs. In this way, the relay UE gets higher priority in getting scheduling resource from donor access node to empty its buffer. In some embodiments, the donor access node assigns the weight $w_i$ to any UE relay having a buffer size between $b_{(i-1)}$ and $b_i$. Other threshold triggers may be conceivable to those having ordinary skill in the art upon reading this disclosure Moreover, the scheduling weight need not be a discrete amount or factor but may be a proportion of an overall bandwidth or capacity available within the network or a donor access node. In this case, increasing a scheduling weight for a relay UE may comprise proportionally adjusting a plurality of scheduling weights for a plurality of UEs accessing resources directly from the donor access node, such that the relay UE has a proportionally higher scheduling bandwidth/priority than the other UEs. Adjusting the scheduling weight may comprise adjusting a proportion of scheduling resources, such as physical resource blocks (PRBs), power, bandwidth, etc. that are provided to the relay UE.

Eventually the method moves to steps 407-410 describing the lowering of scheduling resources based on determining whether any UEs are detaching from the relay UE in step 407. This determination may use registration messages or other signals transmitted from relay UE or from the UE attaching to/detaching from the relay UE. If no UEs are detaching from the relay UE, the method goes back to monitoring 402. However, if UEs are detaching from the relay UE, the sub-buffer size associated with the relay UE is decreased. As mentioned herein, this decrease may be a direct consequence of either UEs detaching from the relay UE, or simply using less resources. Therefore, steps 407-408 can be incorporated into step 409, where a determination is made whether or not the sub-buffer size associated with the relay UE drops below a threshold. If no, the monitoring continues in 402. However, if the sub-buffer decreases beyond a threshold, then the scheduling weight for the relay UE is correspondingly decreased. The scheduling weight may be decreased in fixed increments, proportionally, or relative to other UEs, as described above.

Moreover, this method may loop indefinitely, as it is an ongoing process to adjust scheduling weights in real-time. Therefore, if all UEs are detached from the relay UE, the method may loop back to allocating equal sub-buffer sizes within a downlink buffer on a donor access node, i.e. step 401. If UEs are not detached, the method may loop back to monitoring the status of the relay UEs 402.

Figure 5:
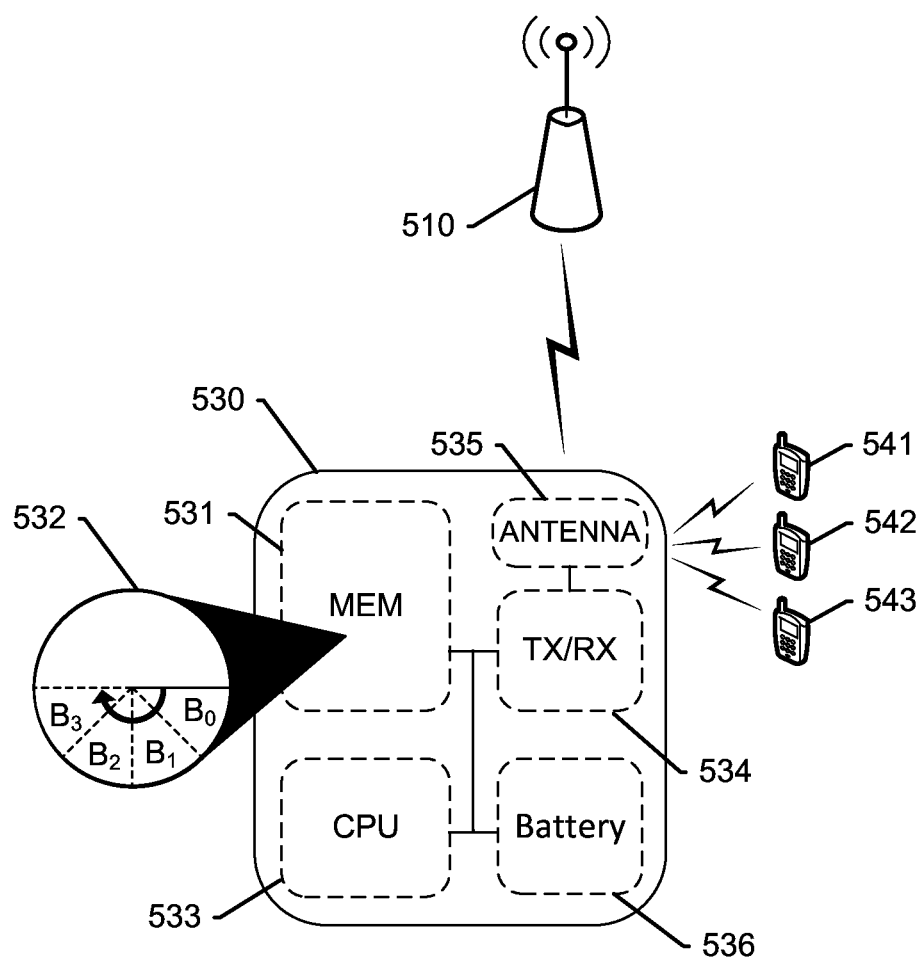
FIG. 5 depicts an exemplary relay node for dynamically prioritizing network traffic using an uplink buffer.

In some embodiments, an uplink buffer of the relay UE may fluctuate in size depending on the number of end-user UEs attached to the relay UE, and/or their traffic demands. FIG. 5 depicts an exemplary relay UE for dynamically prioritizing network traffic using an uplink buffer. A relay node 530 is illustrated as comprising a memory 531 storing an uplink buffer 532, a processor 533, a transceiver 534, and an antenna 535 for direct (i.e. unrelayed) communication with donor access node 510. Relay UE 530 provides services from donor access node 510 to UEs 541, 542, 543. Relay UE 530 may begin to function as a relay UE by sending a message to donor access node 510 to indicate to donor access node 510 that UE 530 is functioning as a relay UE. Thus, donor access node 510 can alter how UE 330 is treated. For example, relay UE 530 may be provided with preferential treatment because it is functioning as a relay. In some embodiments, UE 530 can request to send a buffer status report to donor access node 510. Donor access node 510 can grant this request in a conventional manner. Relay UE 530 may respond to the grant by sending a short buffer status report. This short buffer status report is associated with a logical channel group that indicates the buffer status report is communicating the status of the UE as a relay, and thus is not asking for additional resource allocations (like a 'conventional' buffer status report would indicate). In other words, when a UE responds with a buffer status report for the 'special' logical channel group, it means that the buffer status report is not actually reporting the status of a buffer. Rather, this buffer status report indicates that the UE is now functioning as a relay.

Once status of relay UE 530 is established, relay UE 530 can periodically transmit regular buffer status reports (BSR) to donor access node 510, to enable donor access node 510 (or any other network node) to dynamically allocate resources to relay UE 530 based on a size of uplink buffer 532. Uplink buffer 532 stored on memory 530 may vary in size depending on a number of UEs attached thereto, and traffic requirements thereof. For instance, as UEs 541, 542, and 543 attach to relay UE 530 and/or request services therefrom, uplink buffer 532 increases in size. In one example, as UEs 541, 542, 543 attach to relay UE 530, uplink buffer 532 varies in size from $B_0$ to $B_1$, $B_2$, and $B_3$. In addition to the traffic requirements of UEs 541, 542, 543, the size of buffer 532 depends on operations & maintenance (O&M) traffic between relay UE 530 and UEs 541, 542, 543, signaling traffic generated at relay UE 530, and other variables that may fluctuate in size at the relay UE's buffer that are independent of the usage of UEs 541, 542, 543.

The BSR received at donor access node 510 enables a scheduler to dynamically schedule resources to relay UE 530. In some embodiments, at each threshold $B_1$, $B_2$, etc., the scheduler may assign proportional scheduling weight to relay UE 530. Further, as UEs 541, 542, 543 detach from relay UE 530, or otherwise lower their traffic requirements, the size of buffer 532 may decrease. Subsequent BSRs transmitted to donor access node 510 would then trigger a reduction in the scheduling weight assigned to relay UE 530.

Figure 6:
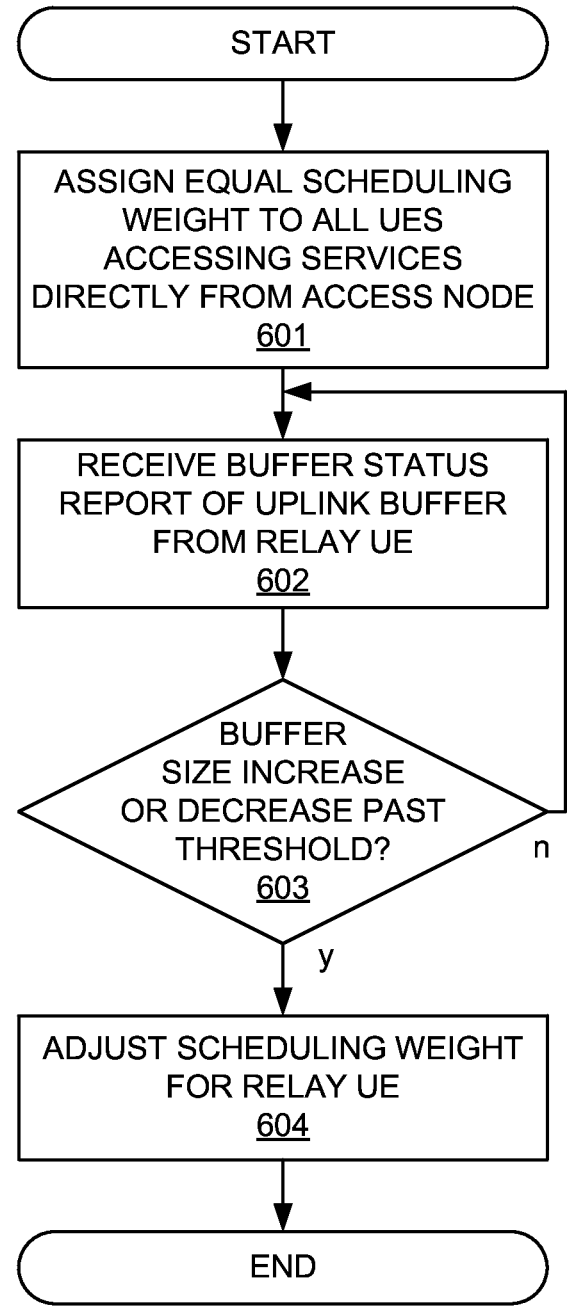
FIG. 6 depicts an exemplary method for dynamically prioritizing network traffic using an uplink buffer.

FIG. 6 depicts an exemplary method for dynamically prioritizing network traffic using an uplink buffer. The method will be discussed with reference to donor access node 510. However, the method can be implemented with any suitable network node. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 601, scheduling weights are equally assigned per UE accessing resources directly from donor access node 510. For example, the donor access node may maintain n weights $w_1, w_2 \ldots, w_n$, corresponding to n levels of buffer size $b_1$, $b_2, \ldots b_n$, where $w_1 < w_2 < \ldots < w_n$, and $b_1 < b_2 < \ldots < b_n$. n may be any number that is 2 or more. By default, the donor access node scheduler assigns weight $w_1$ to standard end-user UEs that attach to it directly. When a buffer size for a relay UE is below b1, the donor access node may assign the same weight $w_1$ to the relay UE. In other words, the relay UE has the same priority in gaining scheduling resources from the donor access node.

In 602, any BSRs transmitted from relay UE 530 are monitored. The monitoring may be triggered by a message sent from the relay UE indicating that the relay UE is functioning as a relay. For example, when the relay UE accesses the wireless network, the relay UE signals to a donor access node that it is a relay that is intended to provide services to multiple end-user UEs. The message may also include a scheduling request that communicates to a donor access node that the relay UE is asking for an allocation of air-interface resources. In response, the donor access node schedules resources for the relay UE, and monitors BSRs received from the relay UE, so as to dynamically adjust scheduling of resources to the relay UE based on a size of the uplink buffer stored on the relay UE.

The buffer size may increase or decrease based on a level of traffic requested by the end-user UE's connected to the relay UE. For instance, an application request on an end-user UE that is relayed to the donor access node via the relay UE may trigger an increase in the uplink buffer size on the relay UE. In other embodiments, when a large number of end-user UEs attach to a relay UE, the size of the uplink buffer associated with the relay UE may be increased. In addition to the traffic requirements of the end-user UEs, the size of the uplink buffer depends on operations & maintenance (O&M) traffic, e.g. between the relay UE 530 and other network elements, signaling traffic generated at relay UE 530, and other variables that may fluctuate in size at the relay UE's buffer that are independent of the usage of UEs 541, 542, 543.

In either case, the buffer size may fluctuate until it reaches a high or low threshold, as determined in 603. If it is determined if the buffer size is not increased past a threshold, the method continues waiting for receipt of BSRs 602. However, if a high or low threshold is met, then in 604, the scheduling weight for the relay UE is increased or decreased. The increase or decrease may be proportional to the threshold increase or decrease of the buffer size as described herein. For example, the scheduling weight may be increased by an incremental amount every time the uplink buffer size increases by a threshold amount, as depicted in FIG. 5. A plurality of thresholds may be defined along with a corresponding plurality of scheduling weights. For example, as traffic demands on the relay UE increase, the buffer size would correspondingly increase. When the buffer size for the relay UE reaches or exceeds $b_2$, the donor access node can assign the next weight $w_2$ to the relay UE, while maintaining weight $w_1$ to the other UEs. In this way, the relay UE gets higher priority in getting scheduling resource from donor access node to empty its buffer. Moreover, the scheduling weight need not be a discrete amount or factor but may be a proportion of an overall bandwidth or capacity available within the network or donor access node.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, 510, UEs 130, 330, 530, and/or network 101.

Figure 7:
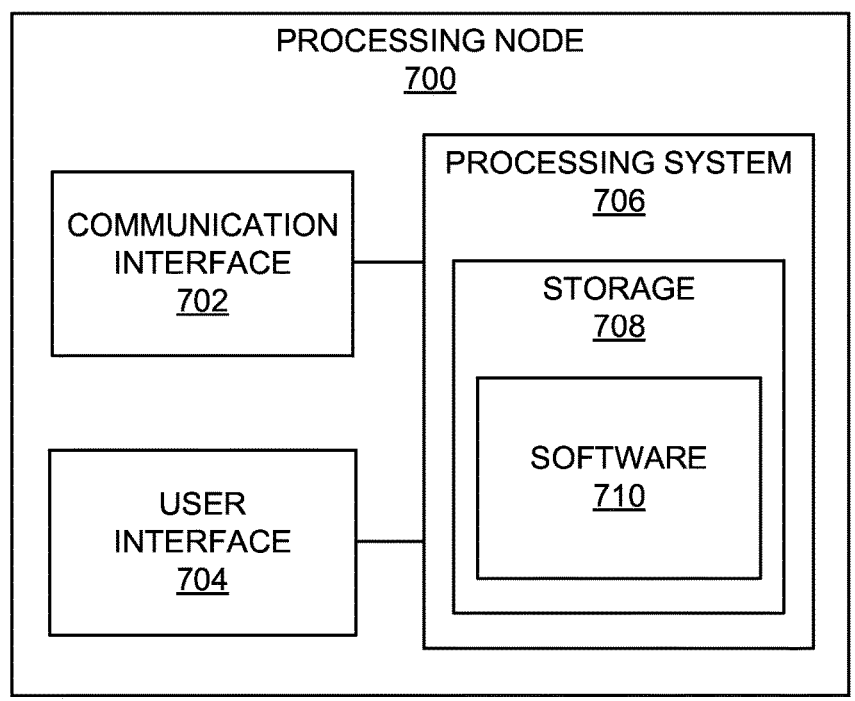
FIG. 7 depicts an exemplary processing node.

FIG. 7 illustrates an exemplary processing node 700 comprising communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a scheduler. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for prioritizing devices in a wireless network, the method comprising:
    receiving, at a donor access node, a message from a relay user equipment (UE) indicating that the relay UE is configured to relay data between the donor access node and one or more end-user UEs;
    in response to receiving the message, monitoring, by the donor access node, a buffer size of a buffer stored on the donor access node and associated with the relay UE, wherein the buffer size reflects, in part, a usage of a first end-user UE that access services via the relay UE;
    determining that the buffer size increases beyond a first threshold; and
    increasing a scheduling weight for scheduling network resources from the donor access node to the relay UE, wherein the scheduling weight comprises a proportion of an overall bandwidth of the donor access node, and
    wherein increasing the scheduling weight comprises proportionally adjusting a plurality of scheduling weights corresponding to a plurality of UEs attached to the donor access node to increase the proportion of the overall bandwidth corresponding to the relay UE.

2. The method of claim 1, wherein the buffer comprises a portion of a downlink buffer stored on the donor access node providing the services to the relay UE, the portion of the downlink buffer being associated with the relay UE.

3. The method of claim 2, wherein the downlink buffer further comprises a second sub-buffer that is associated with a second end-user UE, wherein the second end-user UE accesses the services directly from the donor access node.

4. The method of claim 3, further comprising assigning a standard scheduling weight to the second end-user UE.

5. The method of claim 1, wherein the buffer size associated with the relay UE is a size of an uplink buffer stored on the relay UE.

6. The method of claim 5, wherein monitoring the buffer size further comprises receiving a buffer status report from the relay UE.

7. The method of claim 1, further comprising:
    determining that the buffer size decreases beyond a second threshold; and
    reducing the scheduling weight for scheduling network resources from the donor access node to the relay UE.

8. The method of claim 7, wherein the first and second thresholds are among a plurality of thresholds, and wherein the scheduling weight is increased or decreased proportionally as the buffer size reaches each of the plurality of thresholds.

9. The method of claim 1, further comprising:
    detecting that a quality of service (QoS) from the relay UE fails to meet a QoS criteria; and
    scheduling resources to the relay UE in a next available slot at a higher priority than a second end-user UE accessing services directly from the donor access node.

10. A system for prioritizing devices in a wireless network, the system comprising:
    a donor access node configured to provide wireless services to a first user equipment (UE) via a relay UE, and to a second UE directly; and
    a processor communicatively coupled to the donor access node, the processor for configuring the donor access node to execute operations comprising:
    receiving a message from the relay UE indicating that the relay UE is configured to relay data between the donor access node and the first UE;
    in response to receiving the message, monitoring a buffer size associated with the relay UE, wherein the buffer size reflects, in part, a usage of the first UE that access services via the relay UE;
    determining that the buffer size increases beyond a first threshold;
    increasing a scheduling weight for scheduling network resources from the donor access node to the relay UE, wherein the scheduling weight comprises a proportion of an overall bandwidth of the donor access node, and wherein increasing the scheduling weight comprises proportionally adjusting a plurality of scheduling weights corresponding to a plurality of UEs attached to the donor access node to increase the proportion of the overall bandwidth corresponding to the relay UE;
    determining that the buffer size decreases beyond a second threshold; and
    reducing the scheduling weight for scheduling network resources from the donor access node to the relay UE, wherein reducing the scheduling weight comprises proportionally adjusting the plurality of scheduling weights corresponding to the plurality of UEs to reduce the proportion of the overall bandwidth corresponding to the relay UE,
    wherein the first and second thresholds are among a plurality of thresholds, and wherein the scheduling weight is increased or decreased proportionally as the buffer size reaches each of the plurality of thresholds.

11. The system of claim 10, wherein the buffer size is a size of a downlink buffer stored on the donor access node.

12. The system of claim 10, wherein the buffer size is a size of an uplink buffer stored on the relay UE.

13. The system of claim 12, wherein monitoring the buffer size further comprises receiving a buffer status report from the relay UE.

14. A donor access node for prioritizing devices in a wireless network, the donor access node comprising a memory and a processor, the memory for storing computer-readable logic that enables the processor to perform operations comprising:

receiving, at the donor access node, an indication that a first user equipment (UE) on the wireless network is functioning as a relay UE, wherein the relay UE is configured to relay data between the donor access node and one or more end-user UEs;

in response to the indication, monitoring a buffer size of a buffer stored on the donor access node and associated with the relay UE, wherein the buffer size reflects, in part, a usage of a first end-user UE that access services via the relay UE; and increasing a scheduling weight for scheduling network resources from the donor access node to the relay UE when the buffer size increases beyond a first threshold, wherein the scheduling weight comprises a proportion of an overall bandwidth of the donor access node, and wherein increasing the scheduling weight comprises proportionally adjusting a plurality of scheduling weights corresponding to a plurality of UEs attached to the donor access node to increase the proportion of the overall bandwidth corresponding to the relay UE.

15. The donor access node of claim 14, wherein the operations further comprise:
   determining that a second UE is accessing resources directly from the donor access node without using the relay UE; and
   assigning a default scheduling weight to the second UE.

16. The donor access node of claim 15, wherein the operations further comprise assigning the default scheduling weight to the relay UE upon determining that the buffer size of the relay UE is comparable to a buffer size of the second UE.

17. The donor access node of claim 14, wherein the operations further comprise reducing the scheduling weight for scheduling network resource from the donor access node to the relay UE when the buffer size decreases beyond a second threshold.

18. The donor access node of claim 14, wherein the buffer size is based on operations and maintenance and signaling traffic generated at the relay UE that is independent of the usage of end-user UEs attached to the relay UE.

* * * * *